United States Patent [19]
Foresman

[11] Patent Number: 5,478,511
[45] Date of Patent: Dec. 26, 1995

[54] ANNULAR GAP EXPANDER

[75] Inventor: James D. Foresman, Hughesville, Pa.

[73] Assignee: Andritz Sprout-Bauer, Inc., Muncy, Pa.

[21] Appl. No.: 226,878

[22] Filed: Apr. 13, 1994

Related U.S. Application Data

[63] Continuation-in-part of Ser. No. 59,236, May 7, 1993, Pat. No. 5,366,680.

[51] Int. Cl.⁶ .................................................. B29C 47/92
[52] U.S. Cl. ........................ 264/40.5; 264/40.6; 264/40.7; 264/118; 264/141; 264/176.1; 264/211.10; 264/211.11; 264/211.21; 425/144; 425/145; 425/202; 425/203; 425/311; 425/313; 425/382.3; 425/382.4; 426/516
[58] Field of Search .................... 264/40.5, 40.6, 264/40.7, 176.1, 141–143, 211.10, 209.2, 118, 211.11, 211.21; 425/202, 144–145, 205–209, 203, 382.3, 311, 376.1, 313, 382.4, 382 R, 381, 466, 467, 378.1; 426/516, 503

[56] References Cited

U.S. PATENT DOCUMENTS

| | | | |
|---|---|---|---|
| 2,994,105 | 8/1961 | Seal et al. | 425/376.1 |
| 3,034,421 | 5/1962 | Pence | 425/376.1 |
| 3,137,035 | 6/1964 | Hendry | 425/376.1 |
| 3,382,538 | 5/1968 | Burner . | |
| 3,420,160 | 1/1969 | Mast | 100/39 |
| 3,533,801 | 10/1970 | Wenger | 426/503 |
| 4,097,213 | 6/1978 | McComb et al. | 425/376 |
| 4,171,668 | 10/1979 | Ratcliffe | 264/202 |
| 4,751,030 | 6/1988 | Volk | 264/40.6 |
| 5,149,555 | 9/1992 | Flindall | 426/516 |
| 5,338,559 | 8/1994 | Schaaf | 426/518 |
| 5,366,680 | 11/1994 | Foresman | 264/176.1 |

FOREIGN PATENT DOCUMENTS

| | | | |
|---|---|---|---|
| 2003518 | 7/1971 | Germany . | |
| 1692274 | 7/1971 | Germany . | |
| 1692760 | 3/1972 | Germany . | |
| 2350249 | 4/1975 | Germany . | |
| 61-19445 | 1/1986 | Japan | 425/376.1 |
| 1754475 | 8/1992 | U.S.S.R. | 425/376.1 |
| WO93/04594 | 3/1993 | WIPO . | |

OTHER PUBLICATIONS

International Search Report for International Application No. PCT/US94/04748 (Sep. 5, 1994).

Primary Examiner—Jeffery R. Thurlow
Attorney, Agent, or Firm—Chilton, Alix & Van Kirk

[57] ABSTRACT

A method and apparatus in the context of a rotating conveying screw situated within a cylindrical housing which has an inlet port on one end of the cylinder and a discharge opening on the other end of the cylinder. A resistance plate is mounted transversely to the conveying screw near the discharge opening for corotation with the screw. The plate is mounted to define a discharge gap between the opening and the plate. A sleeve on the housing is employed to adjust the size of the gap between the plate and the opening. A process controller positions the sleeve by means of a pair of screw jacks. The controller adjusts the discharge gap width to maintain feed material temperature within a predetermined band. Alternatively the controller adjusts the discharge gap width and feed screw speed to maintain a predetermined specific energy input into the feed material. The helical screw is preferably supported at both ends by a bearing means. Breaker bars are mounted on the transverse plate and extend over the gap between the discharge opening and the plate. Breaker bars may also be mounted to the cylindrical sleeve and extend over the gap between the sleeve and the plate.

26 Claims, 10 Drawing Sheets

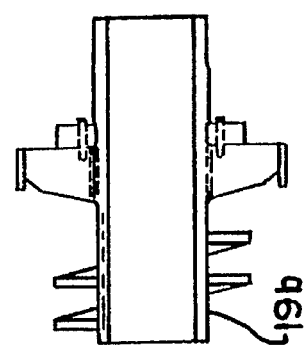
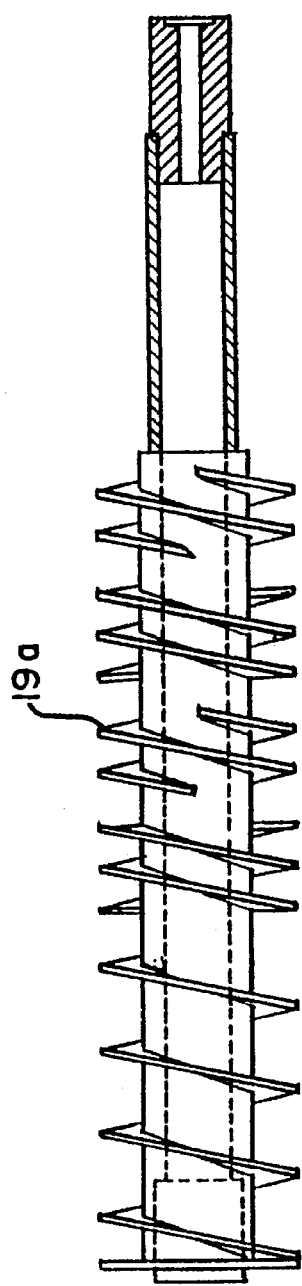
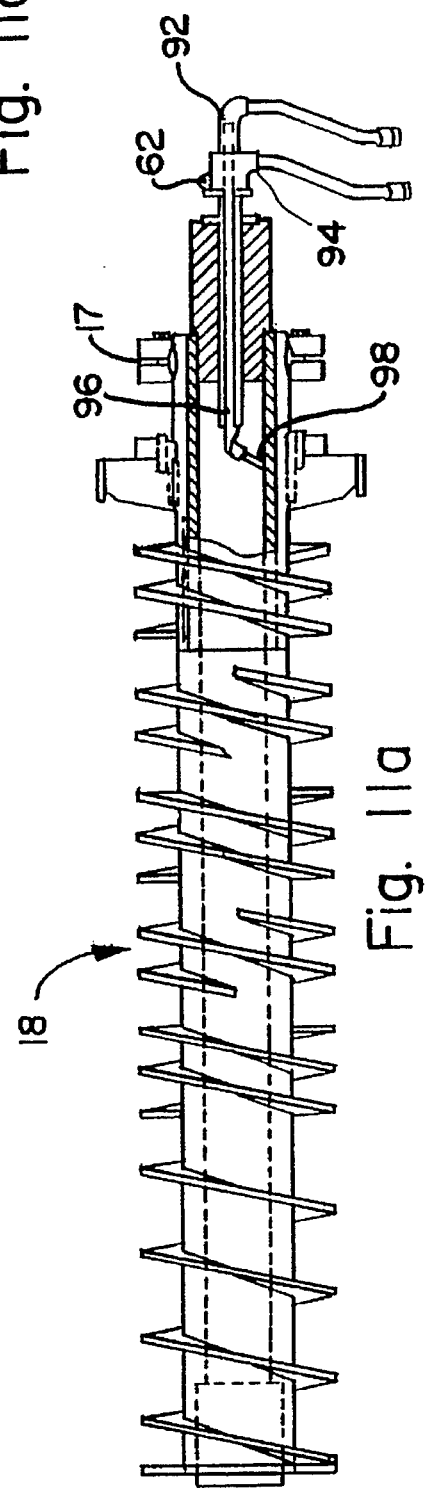

ANNULAR GAP EXPANDER

This is a continuation-in-part of copending application Ser. No. 08/059,236 filed on May 7, 1993, now U.S. Pat. No. 5,366,680.

BACKGROUND OF THE INVENTION

The present invention is directed to conditioning feed material prior to the feed entering a pellet mill, and more particularly, to an annular gap expander to perform the conditioning.

Conditioning refers to adding high levels of mechanical shear and compression to a product, adding high levels of liquids such as fats and molasses to the product, and thoroughly mixing the product. Adding heat to the product is also an advantage because of the reduction of bacteria in the feed. This is important to such operations as poultry production where salmonella can be extremely destructive to the poultry.

In recent years special screw type extruders have been used to highly condition feeds. These units usually consist of a helical conveying screw of rugged construction that has interruptions of the helix evenly positioned along the screw length. Generally at each interruption of the helix along the screw there are positioned radial pins or bars that can be adjusted toward or away from the screw shaft to aid in conditioning. The feed discharges axially at the downstream end of the screw, which is generally not supported by any bearing, resulting in a cantilevered support arrangement for the screw. Resistance to the flow of the feed material through the extruder is produced by a ram that is generally cone shaped and that can be moved axially. The point of the ram is oriented toward the end of the helical screw, and the result is an annular discharge gap between the discharge end of the extruder and the ram. The gap can be adjusted by moving the ram in and out along the axis of the cone.

There are several disadvantages to such an arrangement. First the force of the ram against the flow of the feed translates to the helical screw, therefore increasing the forces on the screw and the bearing arrangement. Since the ram does not generally rotate, the effect of compression on the feed, combined with the high level of liquids in the feed, results in discharging the feed in cohesive lumps. It is usually necessary to install a lump breaker down stream from the extruder to break up any large lumps of conditioned feed. Since only one end of the screw is accessible, it is difficult to directly heat the screw. Other means of heating the feed have included encasing the housing in a heating jacket, increasing the complexity of the extruder.

U.S. Pat. No. 4,097,213 to McComb et al. issued Jun. 27, 1978, is illustrative of another type of prior art extruder apparatus. McComb employs complimentary frustoconically shaped die members to form the annular discharge gap. A female die member is moved axially with respect to a forming die member, which is mounted on the shaft, to adjust the size of discharge gap. Handles, inner and outer annular members, and a sleeve that is internal to the housing are used to move the female die member.

Such a design is impractical for the intended use for several reasons. First, forces developed during adjustment of the gap are imposed on the pressure housing. A large amount of power is required to rotate threaded parts having such large diameters. This power imposes large stresses on the housing which can result in deformation of the housing. A housing designed to withstand such stresses is expensive to manufacture, imposes substantial weight loading on the machine bed, and is difficult to handle during maintenance or repair of the apparatus. Second, such apparatus are effectively limited in size. The parts required to construct a larger mechanism of this design are prohibitively expensive to manufacture. As the apparatus size increases the power required to rotate the threaded parts becomes excessive. The additional power imposes additional stress on the housing. As a practical matter, the power requirements and stresses developed effectively limit the size of such apparatus. Third, the discharge gap of such apparatus cannot be adjusted in a timely manner during operation of the apparatus. The gap is adjusted manually and the operator must overcome the pressure developed in the apparatus. This effectively limits the operator's ability to adjust the discharge gap in a timely manner.

SUMMARY OF THE INVENTION

It is an object of the present invention to provide the high shear compression and mixing forces available in conventional annular gap expanders, while reducing the forces on the helical conveying screw and on the thrust bearings supporting the screw.

It is another object to provide rapid, fine adjustment of the annular gap in large annular gap expanders to control feed temperature or specific energy input to the feed material.

It is a further object to maintain the feed at an optimum temperature thereby reducing the incidence of bacteria in the feed while maintaining the vitamin content of the feed.

These objects are accomplished by a method and apparatus in the context of a conveying screw situated within a cylindrical housing which has an inlet port on one end of the cylinder and a discharge opening on the other end of the cylinder. A motor or other means turns the screw in the housing. In one aspect of the invention, a resistance plate is mounted transversely to the conveying screw near the discharge opening for corotation with the screw. The plate is mounted to define or establish the discharge gap between the opening and the plate. A means is employed to adjust the size of the gap between the plate and the opening.

The resistance plate can be a flat disc, conical, or other shape, so long as it is effectively attached to and rotates with the screw.

The cross section of the discharge housing increases in the direction of screw rotation to avoid blockage or bridging due to expansion of the product volume.

In the preferred embodiment the screw flight is an interrupted helix. At each interruption radial bars or pins extend toward the screw shaft and may be adjusted toward or away from the screw shaft. The screw is constructed such that the last few flights, which experience the greatest amount of wear, may be removed and replaced. The helical screw is supported at both ends by a bearing means. The means for adjusting the gap between the plate and the discharge opening is a sleeve that fits around the end of the cylindrical housing at the discharge opening and can be moved parallel to the length of the cylinder.

A hydraulic means, electric motor and screw jack arrangement, or other means may be employed to move the sleeve and adjust the gap. Screw jacks are utilized in the preferred embodiment. The jack drives are supported at the inlet housing of the expander and are connected to the jack yoke by removable shafts. The jack shafts may be unbolted from the jack drives and jack yokes to provide complete access to the screw housing. The jack drives and the jack yoke are supported by the expander base. Therefore, torque forces generated by the screw jack are transmitted to the base and not to the expander housing. Use of screw jacks allows rapid, fine adjustment of the annular gap. Therefore, the gap may be adjusted to maintain feed material temperature within a control band or to maintain a predetermined specific energy input to the feed material.

In another aspect of the preferred embodiment breaker bars are mounted on the transverse plate. The breaker bars extend over the gap between the discharge opening and the plate. Breaker bars may also be mounted to the cylindrical sleeve and extend over the gap between the sleeve and the plate.

In another aspect of the invention, a flow of steam or a hot fluid enters and/or leaves the interior of the screw, through the end of the screw near the discharge opening. Alternatively, steam can be added at one end of the screw and extracted from the other end the screw.

In the method embodiment of the invention feed is introduced to the inlet end of the housing. The feed is compressed and sheared as it is forced through the housing by the turning helical screw. The movement of the feed through the cylinder housing is impeded by the plate mounted transversely to the helical shaft. The feed can be further compressed as it is forced through the gap between the discharge housing and the plate.

In the preferred embodiment the feed and contained liquids such as fat and molasses, is compressed and sheared as it is forced through the housing by the turning helical screw and passes by the bars or pins at the interrupted flights of the helical screw. The feed temperature is raised by contact with the internally heated conveying screw. A temperature probe located in the discharge region monitors the feed temperatures. As the feed passes through the gap between the discharge housing and the plate it experiences shear forces from the breaker bars mounted on the plate, on the discharge housing, or on both. Any large lumps of the feed are broken up into smaller pieces by the breaker bars.

A signal from the temperature probe is provided as an input to a process controller. The process controller utilizes the feed temperature signal to control the discharge gap. The gap width is adjusted to maintain feed temperature at a level that is high enough to destroy bacteria and low enough to maintain the vitamin content of the feed material.

The invention provides several significant advantages. The arrangement of the plate on the screw allows bearing means to be placed at both ends of the conveying screw. Because the screw is not cantilevered, smaller bearing means can be employed at the inlet end. Easy access is provided to the interior of the screw along the axis at the discharge end, enabling the screw to accommodate heating lines at the discharge end. This results in a simpler construction and the ability to heat the screw directly instead of heating the entire cylinder by means of a hot jacket. Such direct heating reduces the incidence of bacteria in the feed, and is particularly important for poultry operations where salmonella can be highly destructive. By mounting the plate on the helical conveying screw, the forces on the bearings means are reduced. Instead of the ram employed in prior methods, which added to the force on the bearings, the plate creates a force opposite to that which pushes the feed through the apparatus, reducing size requirement for the smaller thrust bearings. Breaker bars mounted on the plate, the cylindrical sleeve, or both the plate and the cylindrical sleeve break up lumps of feed and eliminate the necessity of a device to break up lumps farther down stream in the manufacturing process, The use of a screw jack allows rapid adjustment of the discharge gap during operation of the apparatus. This in turn allows the apparatus to be automatically controlled so as to maintain an optimum feed material temperature.

BRIEF DESCRIPTION OF THE DRAWINGS

These and other objects and advantages of the invention will be described below in connection with the preferred embodiment of the invention and with reference to the accompanying drawings, in which:

FIGS. 11a, 11b and 11c are detailed views of the preferred helical conveying screw of the expander of FIG. 1.

DESCRIPTION OF THE PREFERRED EMBODIMENT

Figure 1:
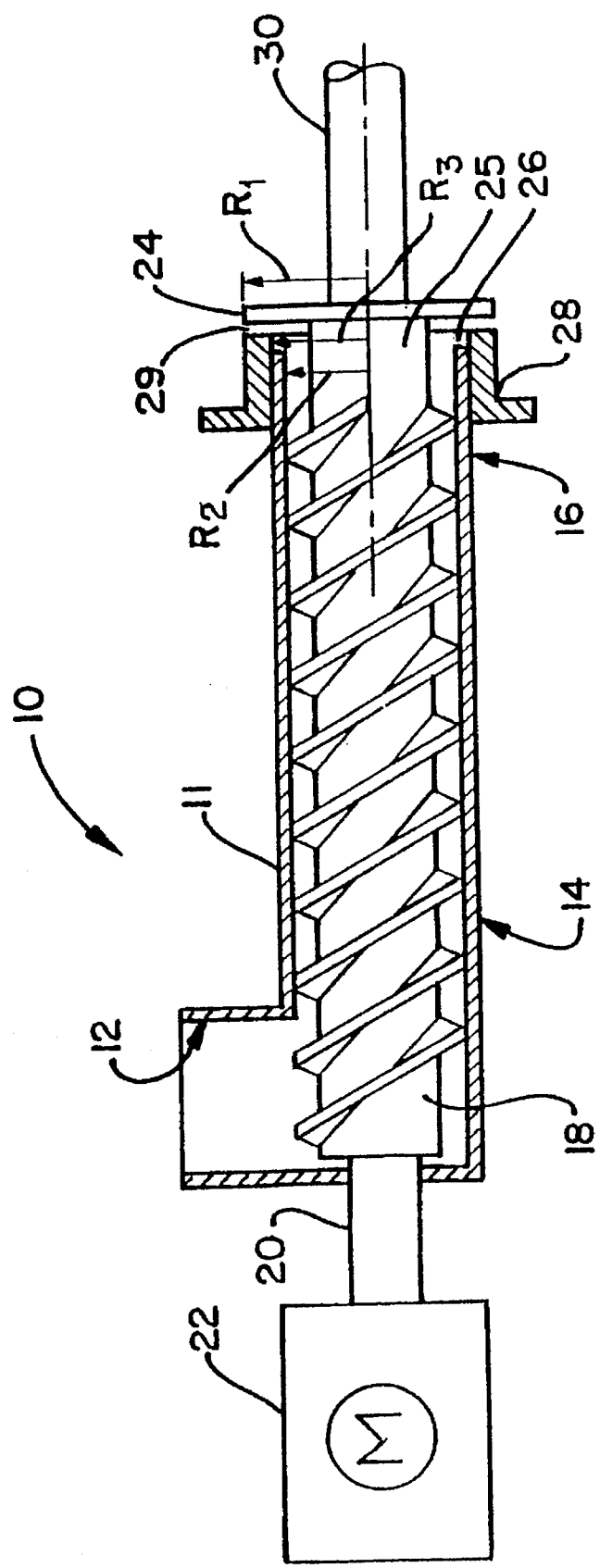
FIG. 1 is a side view, partly in section, of a schematic expander in accordance with the invention.

FIG. 1 shows an annular gap expander 10 which includes a cylindrical housing 11 with an inlet port 12 attached to or formed at a first, or inlet, end. The cylindrical housing 11 has a compressing section 14, and a discharge section 16 at a second, or discharge, end. Inside of the cylindrical housing 11 is a helical conveying screw 18, having an inlet end at the inlet port and a discharge end at the discharge section. A shaft projection 20 at the inlet end connects the helical conveying screw to a means for turning the shaft such a motor 22. A resistance plate 24 is mounted transversely to the discharge end of the helical conveying screw. A smooth portion 25 of the shaft exists between the end of the helix and the plate 24. The plate is mounted so a gap 26 is defined between the discharge end of the housing 16 and the plate 24. In the preferred embodiment the plate 24 is a substantially flat disc. The radius R1 of the plate 24 is greater than the radius R2 of the discharge section of the cylinder 16. The gap 26 is between the end of the discharge section of the housing 16 and the face of the plate 24. A cylindrical sliding sleeve 28 mounts around the discharge end 16 of the cylindrical housing 11. The radius R3 of the sliding sleeve 28 is less than the radius of the R1 of the plate 24. A discharge gap 29 is defined between the end of the sliding sleeve 28 and the face of the plate 24. A shaft projection 30 continues from the discharge end of the helical conveying screw 18 to a bearing means (not shown).

Feed enters inlet port 12 while the helical conveying screw 18 is rotating. The feed is compressed and conditioned as it passes through the compression section 14 of the expander 10. When the feed reaches the smooth portion of the shaft 25, the feed is directed annularly (i.e., radially outward) by plate 24. The feed is then forced through the gap 26 between the discharge section of the housing 16 and the plate 24. In the simplest embodiment the feed would then leave the expander. In the preferred embodiment the feed would continue to be forced through the gap 29 between the sliding sleeve 28 and the plate 24. The gap 29 can be adjusted by sliding the sleeve 28 along the length of the cylinder 11 to adjust the amount of conditioning. The gap 29 width may be measured by a rotary pulse generator 21 which monitors movement of the screw jack 54. The gap 29 width is generally in the range of ½ to ¾ inches. The feed expands and discharges steam as it is extruded through the gap 29. A steam vent 75 provides a discharge path for the steam and maintains the discharge area at atmospheric pressure.

Figure 10:
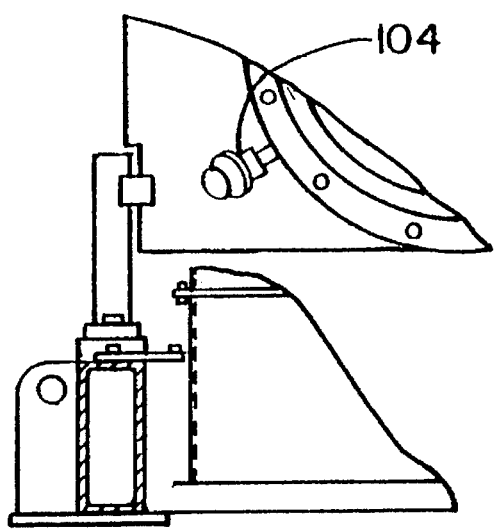
FIG. 10 is an exploded detail view of section A—A of FIG. 8.
Figure 12:
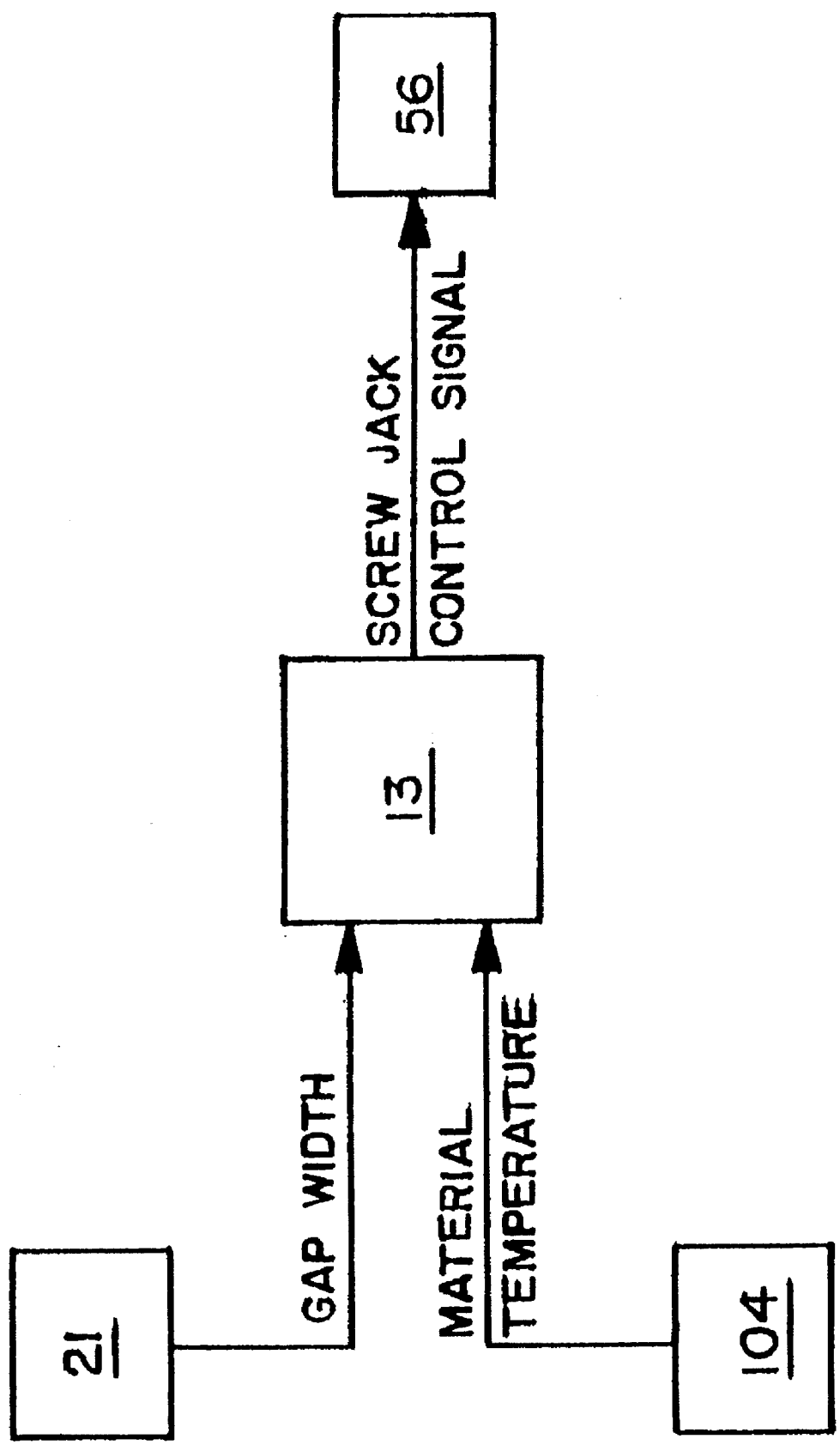
FIG. 12 is a schematic diagram of the control system of the expander of FIG. 1.

Feed conditioning is dependent on the specific energy imparted to the feed material by the expander 10. The specific energy is approximately equal to the material feed rate divided by the power used to compress the feed material. In a preferred embodiment, feed material conditioning for each feed material formula is initially established by adjusting the material feed rate and the gap 29 width. Operating conditions are allowed to stabilize after the initial settings are established for the desired amount of conditioning. Once the initial settings are established, feed material conditioning is automatically controlled by adjusting the discharge gap 29 width to control feed material temperature. A temperature sensor 104, located at the discharge end of the expander 10 at the location at maximum feed compression (FIG. 10), provides an input signal to a process controller 53 which may control the feed screw motor and the screw jack motor 56. In a preferred embodiment, the temperature sensor 104 is a thermocouple mounted in a blind bore in the sliding sleeve 28, as shown in FIG. 10, The thermocouple 104 may be spring loaded to ensure close contact between the thermocouple 104 and the sleeve 28. The controller 53 adjusts the gap 29 width to maintain the feed material temperature within a band of 200°–250° F., whereby the temperature is sufficiently high to kill bacteria and sufficiently low to minimize destruction of feed material vitamins. Alternatively, the gap 29 width and feed screw motor speed may be controlled to maintain specific energy input to the feed material.

Figure 2:
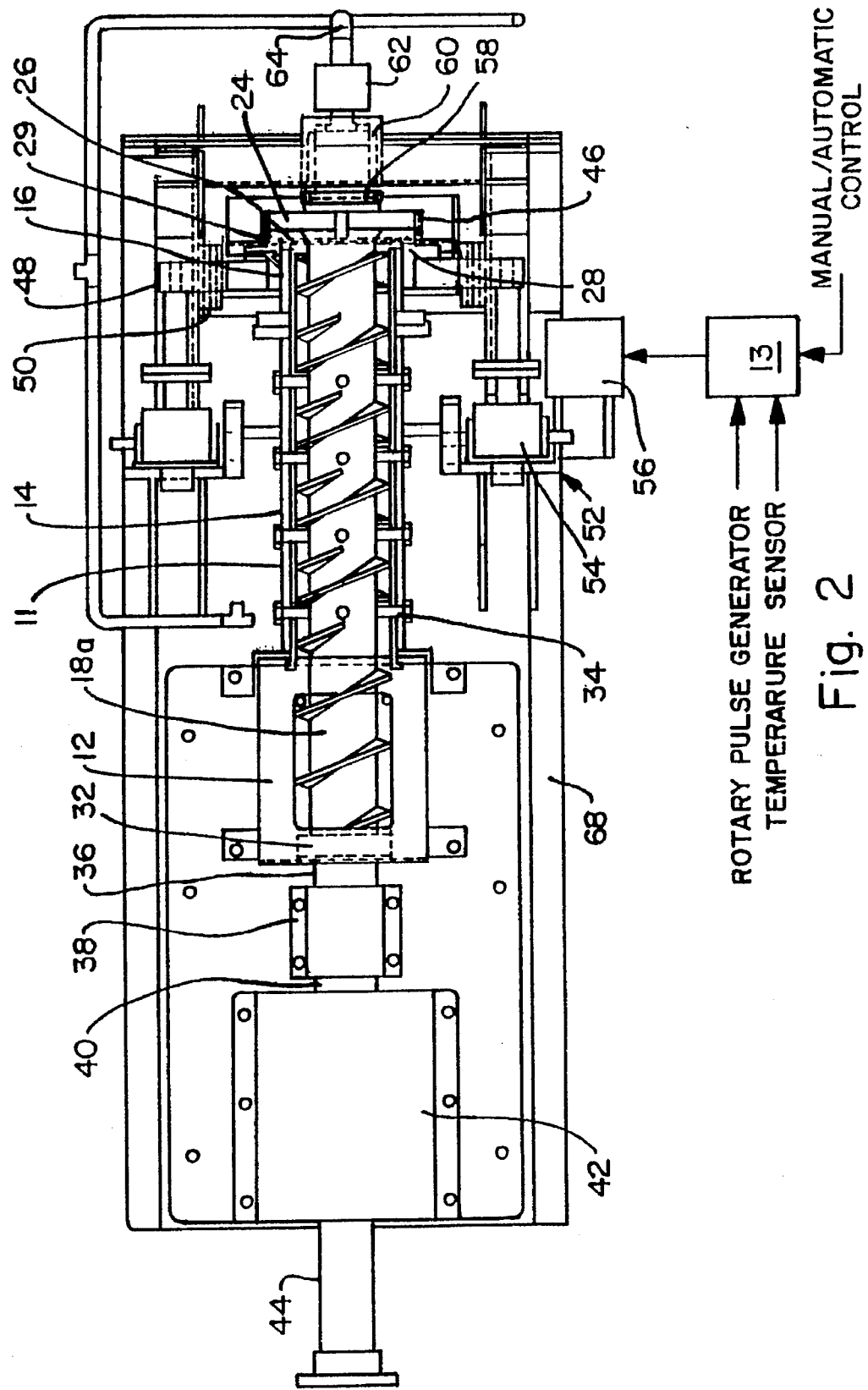
FIG. 2 is a top view, partly in section, of the expander of FIG. 1.

FIG. 2 shows the preferred embodiment of the invention, having the basic elements of a cylindrical housing 11 with an inlet port 12, a compression section 14 and a discharge section 16. Inside the inlet port 12 is a sealing bushing 32 to keep the feed from escaping the inlet port 12. A helical conveying screw with interrupted flights 18a turns inside the cylindrical housing 11". Inside of the compression section 14 of the cylindrical housing 11" adjustable pins or bars 34 are at the interruptions of the flights of the helical conveying screw with interruptions 18a. The adjustable pins or bars 34 can be adjusted radially toward or away from the helical conveying screw.

A shaft 36 connects the helical conveying screw 8a to a coupling 38. The coupling 38 connects through a shaft 40 to a thrust bearing and reducer means 42. The thrust bearing and reducer means 42 accepts the force of the helical conveying shaft 18a as it forces the feed through the compression section 14. Shaft 44 connects the reducer thrust bearing 42 to a means for turning the shaft such as a motor.

A resistance plate 24 is mounted transversely to the discharge end of the helical conveying screw 18a. Mounted to the plate 24 are breaker bars 46 for breaking up lumps of conditioned feed that exit the extruder. A cylindrical sliding sleeve 28 mounts around the discharge end 16 of the cylindrical housing 11. A support mechanism 48 connects the cylindrical sliding sleeve 28 through a sliding key way mechanism 50 to a driving means 52 for moving the cylindrical sliding sleeve 28 to change the discharge gap 29.

The driving means in the preferred embodiment would be by a screw jack 54 connected to an adjustable gear motor 56. Two jack drives 55 are supported at the inlet housing of the expander. A jack shaft 57 connects each jack drive 55 to an associated support mechanism 48. The jack shaft 57 is bolted 59 to the jack drive 55 and support mechanism 48 and is removable, providing complete access to the screw housing. This facilitates disconnection and removal of the split housing halves during maintenance and repair of the expander 10. The jack drives 55 and the support mechanism 48 are supported by the expander base 15. Therefore, torque forces generated by the screw jack 54 are transmitted to the base 15 and not to the cylindrical housing 11. Use of screw jacks 54 allows rapid, fine adjustment of the annular gap 29. Therefore, the gap 29 may be adjusted to maintain feed material temperature within a control band or to maintain a predetermined specific energy input to the feed material.

A shaft 58 connects from the helical conveying screw 18a to a bearing 60. This bearing 60 supports the end of the helical conveying screw 18a, eliminating the need to cantilever the shaft from only one end and reducing the force on the reducer thrust bearing 42. A rotatable coupling 62 connects to the end of the shaft 58 to allow fluid communication of steam or a hot liquid with the interior of the shaft at 58 and the helical conveying screw 18a so that the feed may be heated to reduce the incidence of bacteria. Previous extruders provided heating from the driven end of the helical conveying screw, increasing the complexity of the apparatus at that end of the extruder. Piping 64 delivers the steam or hot fluid to the rotatable coupling 62, and/or removes relatively cooler liquid from the coupling.

The bearing 60 is connected to a support means 66 that is itself mounted to the main frame of the expander 68. The reducer thrust bearing 42, the coupling 36, the inlet port 12, the cylindrical housing 10, the driving means 52 for sliding the sleeve 28, and the key way sliding means 50 are all also mounted to the main frame of the expander 68. The main frame of the expander 68 is mounted on a base 15 which can then be mounted to the floor.

Figure 3:
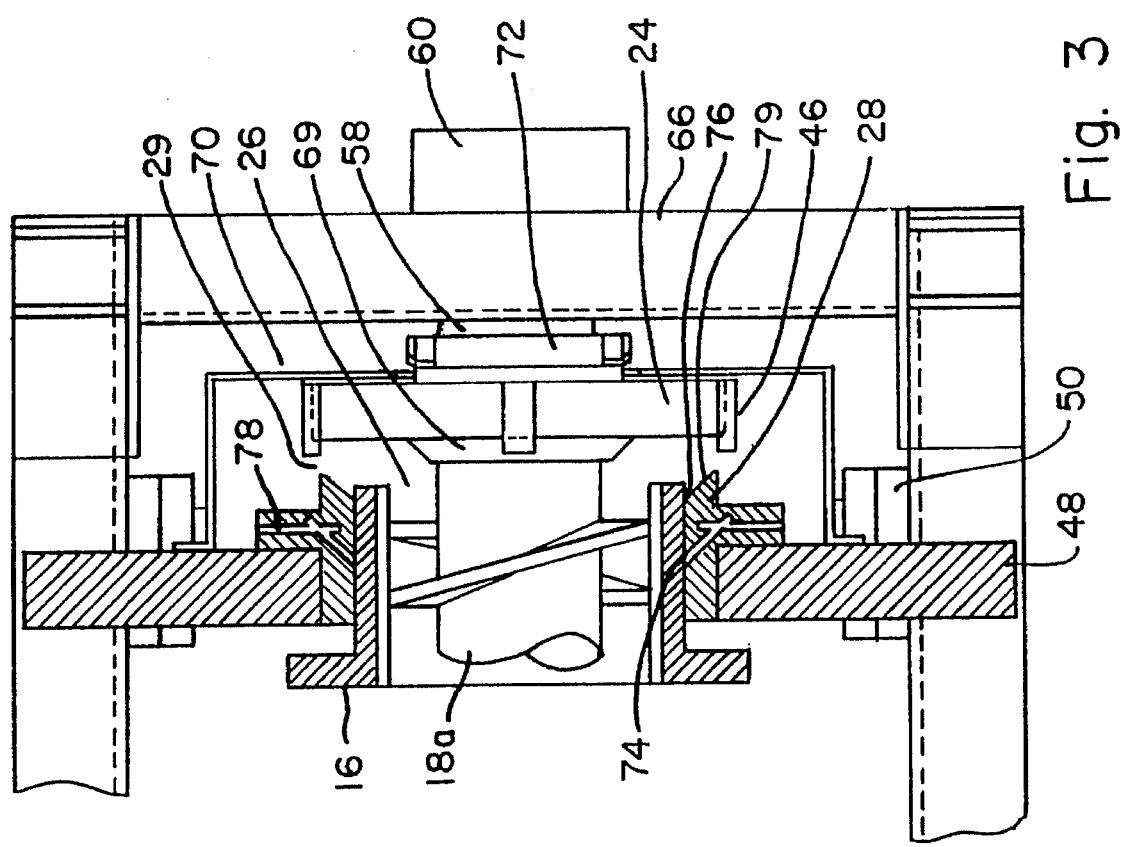
FIG. 3 is a detailed view of the discharge end of the expander of FIG. 2, showing breaker bars mounted on the plate.
Figure 6:
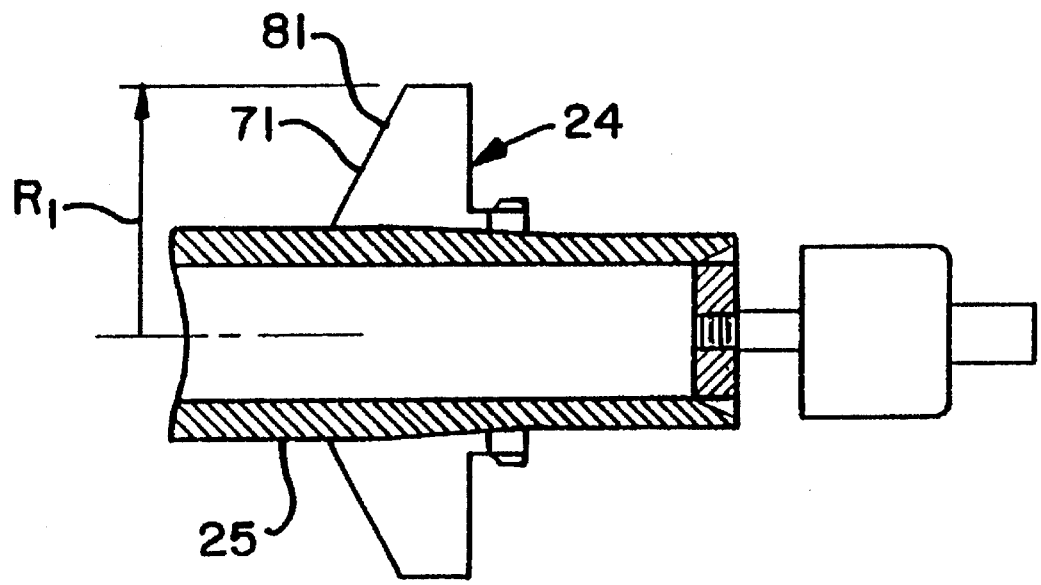
FIG. 6 is an enlarged view of the discharge end of the screw of FIG. 5, showing an alternative embodiment of the resistance plate.
Figure 7:
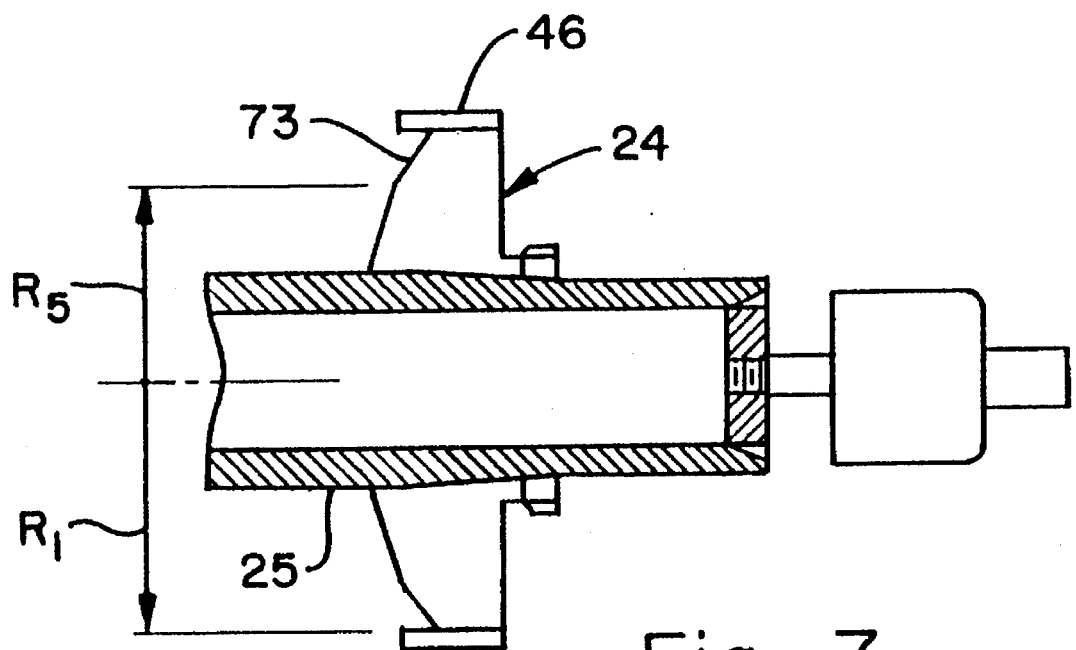
FIG. 7 is a view similar to FIG. 6, showing yet another embodiment of the resistance plate.
Figure 8:
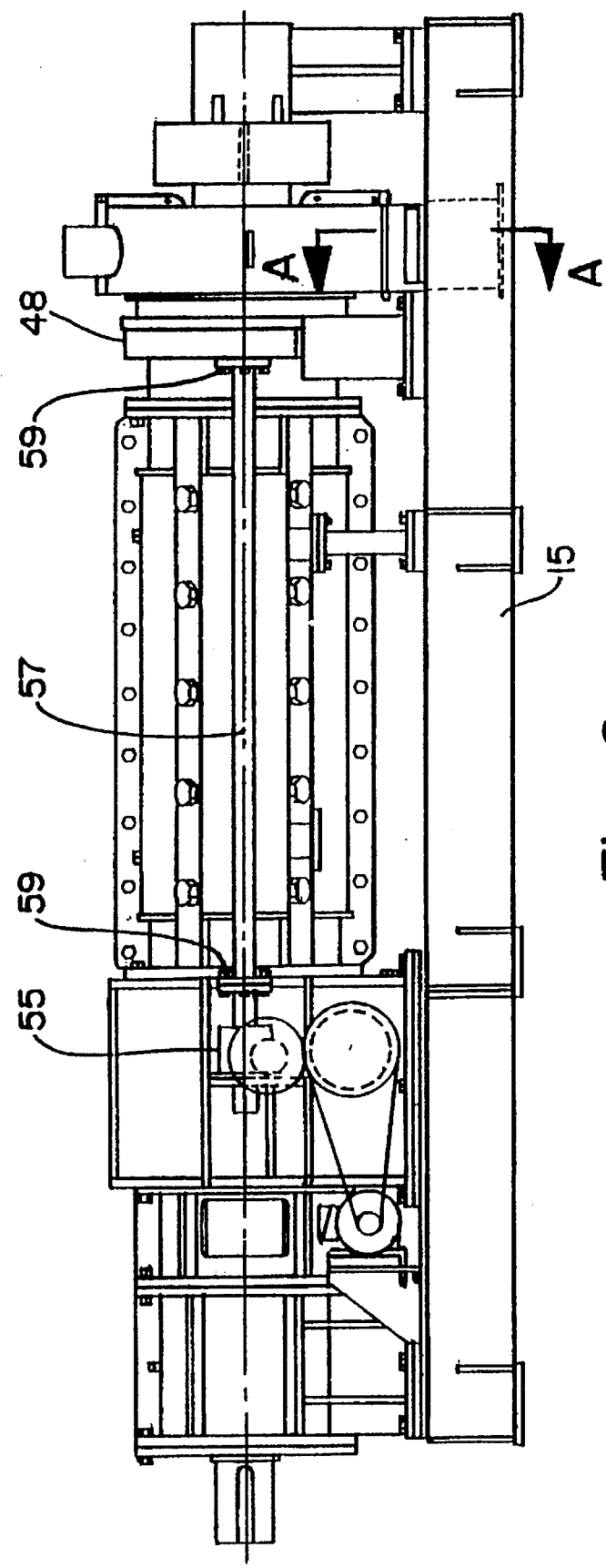
FIG. 8 is a side view, partly in phantom, of the expander of FIG. 1.

FIG. 3 is a detail of the discharge end 16 of the expander shown in FIG. 2. The helical conveying screw 18a extends to the discharge end 16 of the cylinder 10. A tapered shoulder 69 is part of the plate 24 and supports the plate 24 where the plate attaches to the helical conveying screw 18a. The tapered shoulder 69 also helps direct the feed toward gap 26 and gap 29. The shoulder 69 could alternatively define a frustoconical plate with surface 71 that extends from the outer diameter of the shaft portion 25, to the radius R1, as shown in FIG. 6, or surface 73 from an intermediate radius R5 to the radius R1, as shown in FIG. 7.

Figure 9:
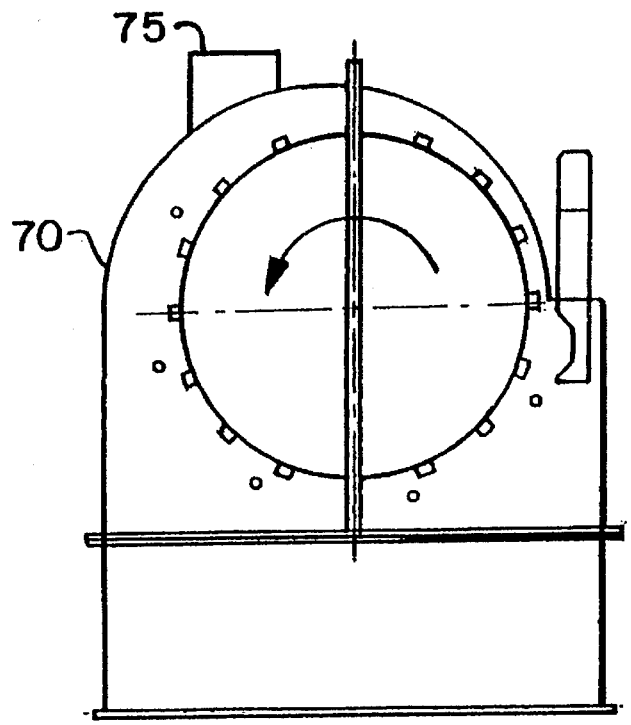
FIG. 9 is an end view, of the discharge housing of the expander of FIG. 1.

Breaker bars 46 are attached in spaced apart relation along the circumference of the plate. 24. The breaker bars 46 are rigidly mounted to the plate 24 and extend over the gap 26 and gap 29. Depending on the positioning of the sliding sleeve 28, the breaker bars 46 can fully cover the gap 29 or only cover part of the gap. The breaker bars 46 function to break large lumps of feed that have passed through gap 29 into smaller particles of feed. In the preferred embodiment the breaker bars 46 are rectangular, but other shapes can also serve to eliminate large lumps of feed emitting from the expander. Around the plate 24 extends a housing 70 that attaches to the sliding sleeve support 48. A steam vent 75 located at the top of the housing 70 maintains the enclosed volume at atmospheric pressure. This housing directs the discharged conditioned feed and prevents the feed from spilling onto the rest of the expander. The cross section of the housing 70 increases in the direction of screw rotation to prevent blockage or bridging due to expansion of the product volume, as shown in FIG. 9. Mounted after the plate is a second flange 72 that also attaches the plate 24 to the helical conveying screw 18a and also interacts with the housing 70 to exclude the conditioned feed from the other regions of the expander. The shaft 58 then continues through the bearing 60. The bearing is supported by the structure 66 (FIG. 2).

In the discharge end 16 of the cylindrical housing 10 are O-rings 74 and 76. The O-rings 74 and 76 create a seal between the discharge end 16 and the cylindrical sliding sleeve 28, keeping feed from interfering with the sliding of the cylindrical sliding sleeve 28. Lubrication ports 78 allow the introduction of lubrication to the area between the O-rings 74 and 76. A support mechanism 48 attaches to the cylindrical sliding sleeve. Also attached to the support mechanism 48 are key ways 50 that guide the support mechanism 48 as it slides along the length of the cylindrical housing 11. The surface 79 of sliding sleeve 28 oriented toward plate 24 is angled. The surface 79 further compresses feed passing through the expander and guides the feed through the gap 29. The outwardly enlarging taper angle of extrusion surface 79 on sleeve 28, can also define the angle of the opposed conical surface 81 or 73 in the plate embodiments shown in FIGS. 6 and 7, respectively.

Figure 4:
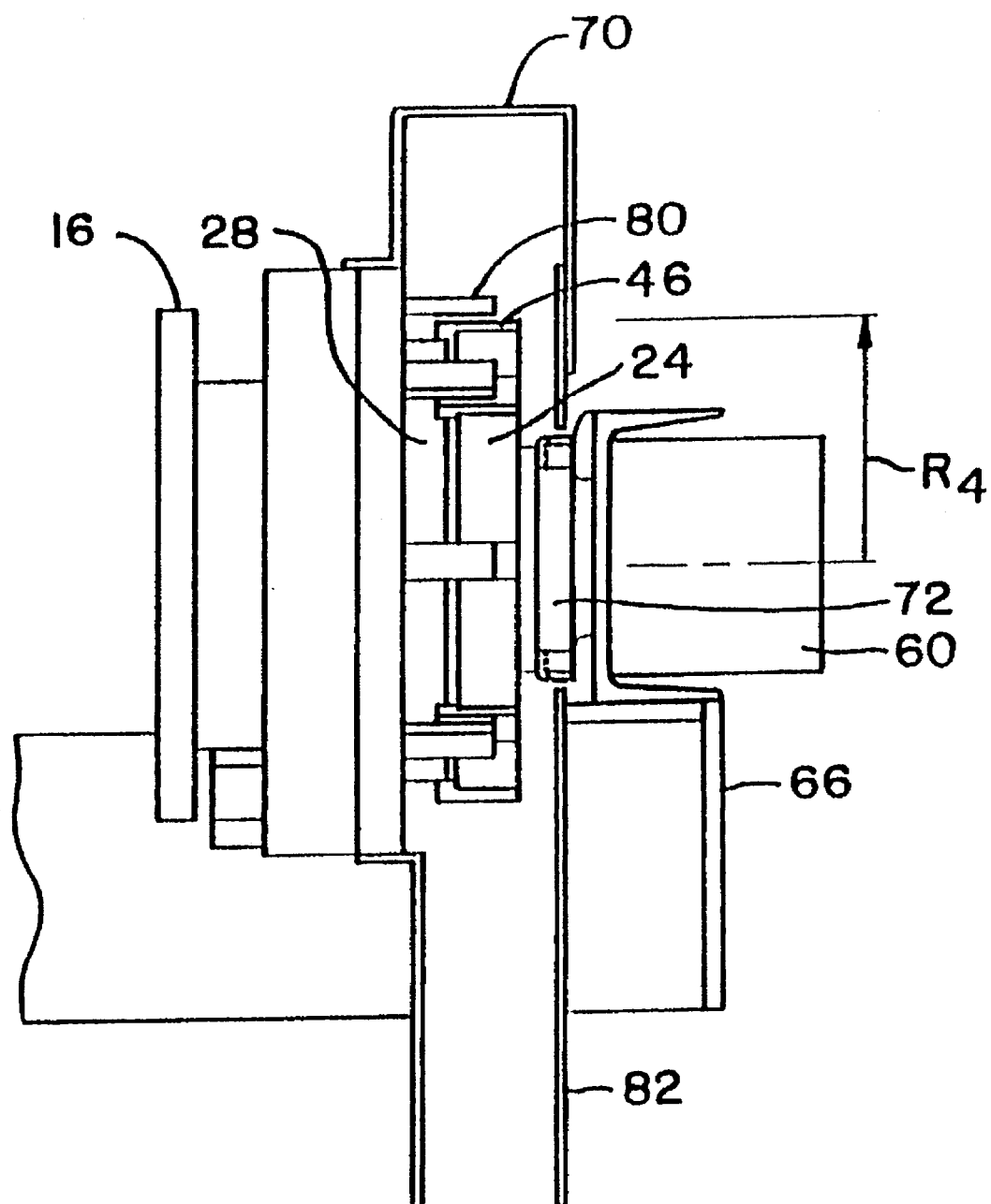
FIG. 4 is a detailed view of an alternative embodiment of the discharge end of the expander with breaker bars mounted on the sliding sleeve and the plate.

FIG. 4 is a detail of the outside of the discharge end 16 of an alternative embodiment of the expander. Plate 24 has breaker bars 46 of the type shown in FIG. 3. Also shown are breaker bars 80, rigidly mounted to the sliding cylindrical sleeve 28. The breaker bars 80 are rectangular in shape, although other shapes can also serve to break feed into smaller particles. The breaker bars 80 extend over gap 26 and gap 29. In one embodiment the breaker bars 80 are positioned outside the radius R4 defined by the outside circumference of plate 24 with breaker bars 46, and do not interfere with the rotation of plate 24 with breaker bars 46. Breaker bars 80 on the sliding cylindrical sleeve 28 interact with the breaker bars 46 on the plate 24 to fully break up clumps of conditioned feed that exit from the gap between the plate 24 and the discharge end 16 of the extruder. Bearing 60 is mounted to the support structure 66. The housing 70 directs the conditioned feed exiting the discharge end 16 down through the exit port 82 where it will continue on for further processing. Flange 72 supports the plate 24 and interacts with the housing 70 to exclude conditioned feed from the rest of the expander.

FIG. 11a is a detail of the preferred shaft of the helical conveying screw. The shaft 18 consists of two sections 19a and 19b held together by a clamp 17. Such construction facilitates replacement of the discharge end screw flights, which experience the greatest amount of wear. A rotatable coupling 62 is mounted to the end of shaft 19b. Steam is injected into port 92 and extracted from port 94. The steam enters the shaft 19b at the axis through tube 96 and the condensed liquid is extracted from the shaft 19b by pick-up tube 98 which is in part concentric within tube 96. In the embodiment of heating with steam, the steam enters the shaft through port 92 and tube 96. The steam fills the space in the shaft. Where the steam is in contact with the surfaces, it condenses to a liquid and collects on the lower section of the shaft 19b. The liquid is then withdrawn from the shaft by pick-up 98 and exits by port 94.

Figure 5:
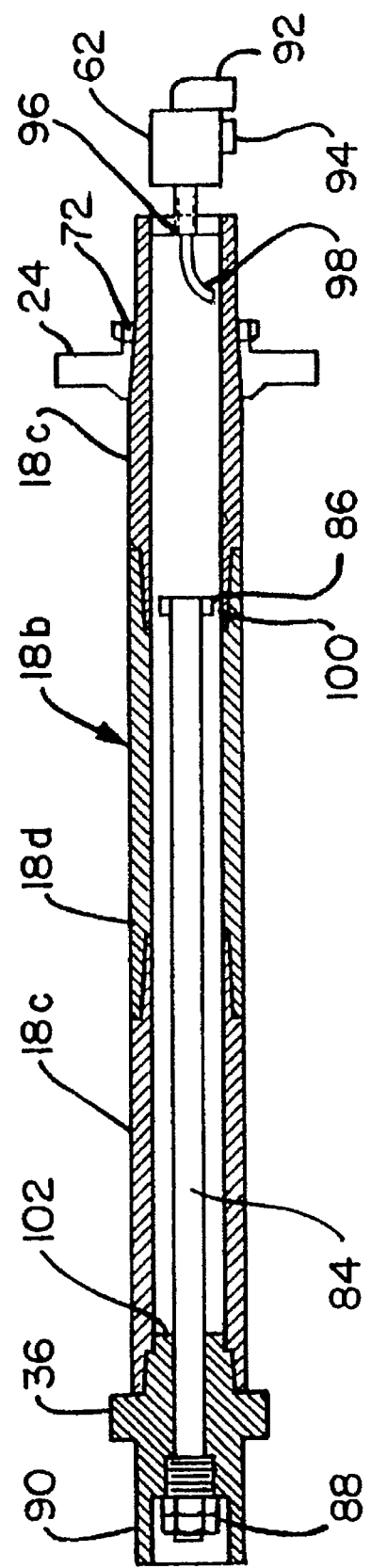
FIG. 5 is a detailed view of the fluid joint to add steam or hot fluid to the helical conveying screw.

FIG. 5 is a detail of an alternate embodiment of the shaft of the helical conveying screw without the flight detail. The shaft 18b consists of three sections 18c, 18d and 18e held together by tension bar 84. Tension bar 84 extends longitudinally within the shaft and attaches to a tension bar plate 86 which press fits against the inside wall of shaft section 18e. The other end of the tension rod 84 passes through shaft 36 and is secured by jam nut 88 and washers or Bellville springs 90. Mounted to shaft section 18e are plate 24 and flange 72. Tension bar plate 86 contains passages 100 to allow steam or hot fluid to reach other portions of the shaft 18b, and where the tension bar 84 passes through shaft 36, seal 102 keeps steam or hot fluids from passing through to other portions of the expander.

Those skilled in this field can readily adapt the screw shown in FIG. 5, to accommodate liquid heating, by which relatively hot liquid is introduced axially via coupling 62 at the discharge end and withdrawn at the driven end.

The advantage is that the heating steam can be more easily added and extracted at the end ore shaft 18 opposite the end to which the motor or drive mechanism 22 attaches. Even in a fully liquid-heated arrangement, the ability to flow the hot liquid into the end of the screw shaft and out the other, considerably simplifies the component arrangement and interaction at the driven end of the screw.

I claim:

1. An annular gap expander comprising:

a cylindrical housing with an inlet port at a first end and a discharge section with a discharge opening at a second end;

a conveying screw coaxially located within the cylindrical housing and including an inlet end at the housing inlet port and a discharge end at the housing discharge opening;

means for rotating the conveying screw;

a plate transversely mounted to the discharge end of the conveying screw near the discharge opening of the housing, thereby defining an annular gap between the plate and the discharge opening;

a cylindrical sleeve disposed around the discharge section of said cylindrical housing defining a discharge gap in confronting relation with said plate, and means for sliding said cylindrical sleeve laterally along the cylindrical housing to a plurality of longitudinal positions so that said discharge gap can be adjusted; and a discharge housing disposed around said discharge gap, into which the extruded material abruptly expands after passing through the discharge gap.

2. The annular gap expander of claim 1 wherein said means for sliding said sleeve are connected to opposite lateral sides of said sleeve.

3. The annular gap expander of claim 2 wherein said means for sliding comprises screw jacks connected to adjustable gear motors by jack shafts extending longitudinally on opposite lateral sides of the cylindrical housing.

4. The annular gap expander of claim 3 wherein each jack shaft has first and second opposite ends, said jack shaft first end being connected to said motor by a plurality of bolts, said jack shaft second end being connected to said screw jack by a plurality of bolts, and said motors being situated laterally of the first end of the cylindrical housing.

5. The annular gap expander of claim 1 wherein said discharge housing is spaced at a lateral distance from said discharge gap wherein said distance increases in the direction of screw rotation.

6. The annular gap expander of claim 1 further comprising temperature sensing means positioned upstream of the plate and adjacent said discharge opening.

7. The annular gap expander of claim 6 wherein temperature sensing means are mounted on said cylindrical sleeve.

8. The annular gap expander of claim 7 wherein said temperature sensing means comprises a thermocouple.

9. The annular gap expander of claim 8 wherein said cylindrical sleeve includes a transverse partial bore, said thermocouple being disposed in said bore.

10. The annular gap expander of claim 7 wherein said temperature sensing means comprises transmitter means for transmitting a temperature signal to controller means whereby said controller means maintains said temperature signal within a predetermined band by adjusting said discharge gap.

11. The annular gap expander of claim 10 wherein said temperature band is from 200°–250° F.

12. The annular gap expander of claim 1 wherein said conveying screw comprises first and second screw segments and clamp means wherein said clamp means clamps said second segment to said first segment.

13. The annular gap expander of claim 12 wherein said first segment comprises a discharge end portion and said second segment defines a throughbore wherein said first segment discharge end portion is received by said second segment bore.

14. The annular gap expander of claim 4 further comprising base means wherein said motor and said screw jack are supported by said base means, said jack means generating a torque force while sliding said sleeve, wherein said torque force is transmitted to said base means whereby said sleeve is positionable along said cylindrical housing without imposing torque force on said housing.

15. The annular gap expander of claim 5 further comprising a steam vent, said stem vent being in fluid communication with said discharge gap and being positioned on a top portion of said discharge housing.

16. An annular gap expander unit comprising:

a cylindrical housing with an inlet port for receiving feed material at a first end, a compression section for compressing the material and a discharge section with a discharge opening for extruding the compressed material at a second end;

a conveying screw coaxially located within the cylindrical housing and including an inlet end at the housing inlet port and a discharge end at the housing discharge opening;

first means, for rotating the conveying screw whereby feed material is conveyed, compressed, and extruded as a result of the rotation of the screw;

second means comprising a plate, transversely mounted to the discharge end of the conveying screw for co-rotation therewith near the discharge opening of the housing, thereby defining a radially oriented gap between the second means and the discharge opening;

sleeve means comprising a cylindrical sleeve disposed around the discharge section of said cylindrical housing defining a discharge gap in confronting relation with said second means and means for sliding said cylindrical sleeve laterally along the cylindrical housing to a plurality of longitudinal positions so that said discharge gap can be adjusted, said means for sliding said sleeve being connected to opposite lateral sides of said sleeve;

a discharge housing disposed around said discharge gap, into which the extruded material abruptly expands after passing through the discharge gap;

temperature sensing means mounted on said sleeve means, said temperature sensing means comprising transmitter means for transmitting a temperature signal; and control means for controlling said means for sliding said sleeve means, wherein said temperature sensing means transmits a temperature signal to said controller means whereby said controller means maintains said temperature signal within a predetermined band by adjusting said discharge gap.

17. The annular gap expander of claim 16 wherein said means for moving the sleeve comprises a pair of jack means, each of said jack means comprising a screw jack connected to an adjustable gear motor by a jack shaft.

18. The annular gap expander of claim 17 wherein said jack shaft has first and second opposite ends, said jack shaft first end being connected to said motor by a plurality of bolts, said jack shaft second end being connected to said screw jack by a plurality of bolts.

19. The annular gap expander of claim 16 wherein said discharge housing is spaced at a lateral distance from said discharge gap wherein said distance increases in the direction of screw rotation.

20. The annular gap expander of claim 16 wherein said temperature sensing means comprises a thermocouple.

21. The annular gap expander of claim 20 wherein said sleeve means defines a transverse partial bore, said thermocouple being disposed in said bore.

22. The annular gap expander of claim 16 wherein said temperature band is from 200°–250° F.

23. The annular gap expander of claim 16 wherein said conveying screw comprises first and second screw segments and clamp means wherein said clamp means clamps said second segment to said first segment.

24. The annular gap expander of claim 23 wherein said first segment comprises a discharge end portion and said second segment defines a bore wherein said first segment discharge end portion is received by said second segment bore.

25. A method for extruding and expanding material by rotating a screw within a substantially cylindrical housing, comprising the steps of:

conveying the material with said screw from an inlet port to a discharge opening in the housing;

raising the temperature of the material by compressing and heating the material;

rotating a resistance plate with the rotating screw at the discharge opening, where a discharge gap is formed between said plate and a cylindrical sleeve disposed around the housing such that material extrudes out of the housing substantially radially through said discharge gap and wherein the temperature of the material is affected by said discharge gap;

sensing change in the temperature of the material by measuring the temperature adjacent the discharge opening;

transmitting a signal representative of the measured temperature to a process controller wherein the process controller adjusts the discharge gap with the cylindrical sleeve to maintain the temperature within a predetermined band.

26. The method of claim 25 further comprising the steps of:

adjusting the feed rate of the material and the gap width to obtain an initial specific energy input into the feed material.

* * * * *